(12) United States Patent
Sawachi

(10) Patent No.: US 7,408,137 B2
(45) Date of Patent: Aug. 5, 2008

(54) IMAGE CAPTURE DEVICE WITH A MAP IMAGE GENERATOR

(75) Inventor: Youichi Sawachi, Saitama (JP)

(73) Assignee: Fujifilm Corporation, Tokyo (JP)

( * ) Notice: Subject to any disclaimer, the term of this patent is extended or adjusted under 35 U.S.C. 154(b) by 281 days.

(21) Appl. No.: 11/169,887

(22) Filed: Jun. 30, 2005

(65) Prior Publication Data

US 2006/0001757 A1    Jan. 5, 2006

(30) Foreign Application Priority Data

Jul. 2, 2004    (JP)    ............................. 2004-197192

(51) Int. Cl.
  *H01L 27/00*    (2006.01)
  *G01N 21/86*    (2006.01)

(52) U.S. Cl. ............................... 250/208.1; 250/559.29

(58) Field of Classification Search ............. 250/208.1, 250/201.2, 201.5, 559.29, 559.38; 396/429, 396/287; 702/150–155, 157, 5, 16; 348/113, 348/118–120; 701/200, 207, 208, 213, 214, 701/23–25

See application file for complete search history.

(56) References Cited

U.S. PATENT DOCUMENTS 5,262,867 A * 11/1993 Kojima ........................ 348/39

6,898,516 B2 * 5/2005 Pechatnikov et al. ........ 701/202
2003/0081119 A1 * 5/2003 Robinson et al. ............ 348/135
2004/0252192 A1 * 12/2004 Adachi et al. ................ 348/148

FOREIGN PATENT DOCUMENTS

| JP | 9-98323 A | 4/1997 |
|---|---|---|
| JP | 2001-169164 A | 6/2001 |
| JP | 2001-216309 A | 8/2001 |

* cited by examiner

*Primary Examiner*—Que T. Le
*Assistant Examiner*—Pascal M Bui-Pho
(74) *Attorney, Agent, or Firm*—Birch, Stewart, Kolasch & Birch, LLP

(57) ABSTRACT

A digital camera receives position information from GPS satellites for detecting camera position when capturing an image. Additional information, which is composed of the camera position, camera azimuth and focal distance of the taking lens, is added to image data of the captured image as tag and recorded in an image file. When the captured image is reproduced, the map image generated according to the additional information is displayed below the captured image, covering an area from the image capture point toward the subject in the captured image. Field view lines and map symbols indicating the subjects are displayed in the map image. Further, the map image includes the extension line which passes the map symbol and is extended to the subject in the captured image for showing the correspondence between the map symbol and the subject.

40 Claims, 14 Drawing Sheets

IMAGE CAPTURE DEVICE WITH A MAP IMAGE GENERATOR

BACKGROUND OF THE INVENTION

1. Field of the Invention

The present invention relates to a map display system and a digital camera for displaying a map in association with a captured still image.

2. Background Arts

Digital camera converts a subject image captured by an image sensor such as a CCD into an image signal, and records the image signal in a recording medium such as an internal memory, a memory card and the like. Japanese Patent Laid-Open Publication Nos. 9-98323, 2001-169164 and 2001-216309 disclose digital cameras and the like which detect a camera position and a camera azimuth and record the detected results and names of the subjects in association with the image signal.

Each of the digital cameras disclosed in the above references includes a GPS processing unit for receiving signals from a GPS satellite to detect the camera position, an azimuth sensor for detecting the camera azimuth and a distance sensor for detecting a camera-to-subject distance, and identifies the subject according to the detected results.

When normally capturing the image, plural subjects are often included in an image capture field, such as mountains, buildings and the like. However, the methods disclosed in the above references, which identify the subject according to the camera position, camera azimuth and the camera-to-subject distance, are inconvenient in capturing the plural subjects in the image capture field at one time since each of the plural subjects cannot be identified separately. Also, each subject cannot be exactly identified when capturing the plural subjects located close to each other.

SUMMARY OF THE INVENTION

An object of the present invention is to provide a map display system and a digital camera which enable to identify plural subjects in a captured image.

Another object of the present invention is to provide the map display system and the digital camera which enable to display names of the subjects.

In order to achieve the above and other objects of the present invention, a map image is generated according to additional information, which is composed of a location, an orientation of an image capture device, and a focal distance of a taking lens of the image capture device, and the map image and the captured image is displayed in such a way that the name displayed in the map image is associated with the subject in the captured image.

The map display system according to the present invention comprises the image capture device and a display device. The image capture device includes the following: an image sensor for capturing the subject; a position detector for detecting the location of the image capture-device; an azimuth detector for detecting the orientation of the image capture device and a focal distance detector for detecting a focal distance of the taking lens. The display device includes a map image generator and a display for displaying the generated map image. The map image generator generates a desired map image according to the additional information which is composed of the location and the orientation of the image capture device and the focal distance of the taking lens. The map image is arranged to cover the location of the image capture device toward the subject in the map image, and a range of view angle is displayed in the map image in accordance with the focal distance. It is preferable to implement the map display system in a digital camera.

The position detector identifies the location of the image capture device by receiving signals from GPS satellites. The map image generator loads map image data for generating said map image from a server via a mobile phone connected to the image capture device.

The map display system further includes a recording medium. The recording medium comprises an image file with an image area and a tag area. The captured image is stored in the image area and the additional information is stored in the tag area.

In the map image, map symbols which correspond to the subjects are shown in the map image, and textual information, such as position information and names, is added. A range of view angle in the map image is indicated by a pair of field view lines and each field view line extends from the camera position, which is a center of one edge of the map image, toward both ends of an opposite edge of said map image. The captured image and the map image are adjacently displayed in an up-and-down direction. A length of a lower edge of the captured image in a horizontal direction is equal to a length of the range of view angle at an upper edge of the map image. Further a display magnification of the captured image in a horizontal direction is gradually increased from a lower edge to an upper edge of the captured image. Further, an extension line extends from the camera position into the captured image through the map symbol on the map image. The map symbol located on the extension line denotes the subject which overlaps with the extension line.

It is preferable to generate image data in which textual information is fit to a corresponding position in the captured image. The textual information relates to the map symbol included in the range of view angle in the map image. Further, it is preferable to designate an arbitrary position in the captured image by a position designator and generate the image data in which textual information is fit in the designated position. The textual information relates to the map symbol in the map image, which corresponds to the designated position or the extension line close to the designated position.

In response to each of changes in the additional information, the map image and the range of view angle in the map image are updated. Further, the display magnification of the map image is updated in response to changes in the focal distance of the taking lens.

According to the present invention, it becomes possible to identify each subject in the captured image, since the map image is generated to cover from the camera position according to the additional information, which is composed of the camera position, the camera azimuth and the focal distance, toward the subject in the captured image, and on which the range of view angle of the taking lens is shown. Further, each subject is readily distinguished by displaying the symbol or the name of the subject on the map image.

BRIEF DESCRIPTION OF THE DRAWINGS

The above objects and advantages of the present invention will become apparent from the following detailed descriptions of the preferred embodiments when read in association with the accompanying drawings, which are given by way of illustration only and thus do not limit the present invention. In the drawings, the same reference numerals designate like or corresponding parts throughout the several views, and wherein.

DETAILED DESCRIPTION OF THE EMBODIMENTS

Figure 1:
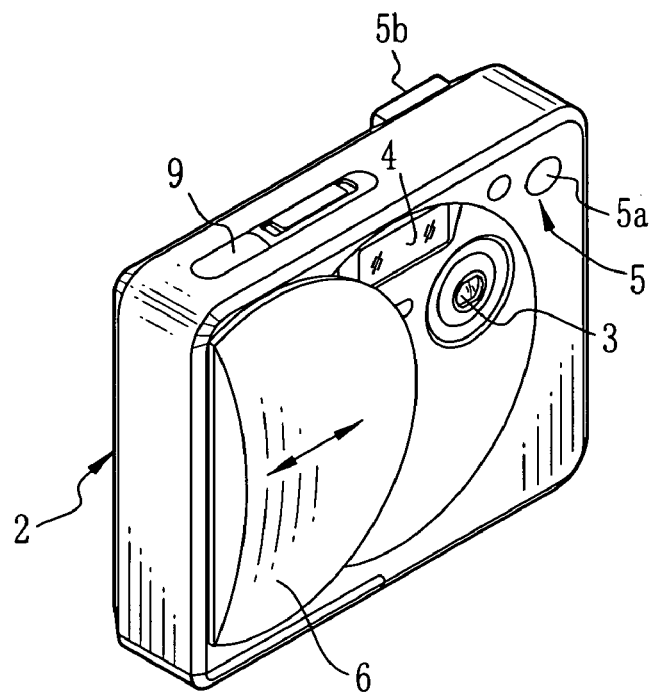
FIG. 1 is a perspective view of a digital camera according to the present invention viewed from the front.

In FIG. 1, a taking lens 3, a flash emitter 4, a front viewfinder window 5a of an optical viewfinder 5 and a lens barrier 6 are disposed on the front of a digital camera 2. The lens barrier 6 is slidable between a close position and an open position, in which the lens barrier 6 covers and uncovers the taking lens 3 and the flash emitter 4. In the open position, a power of the digital camera 2 is turned on.

Figure 2:
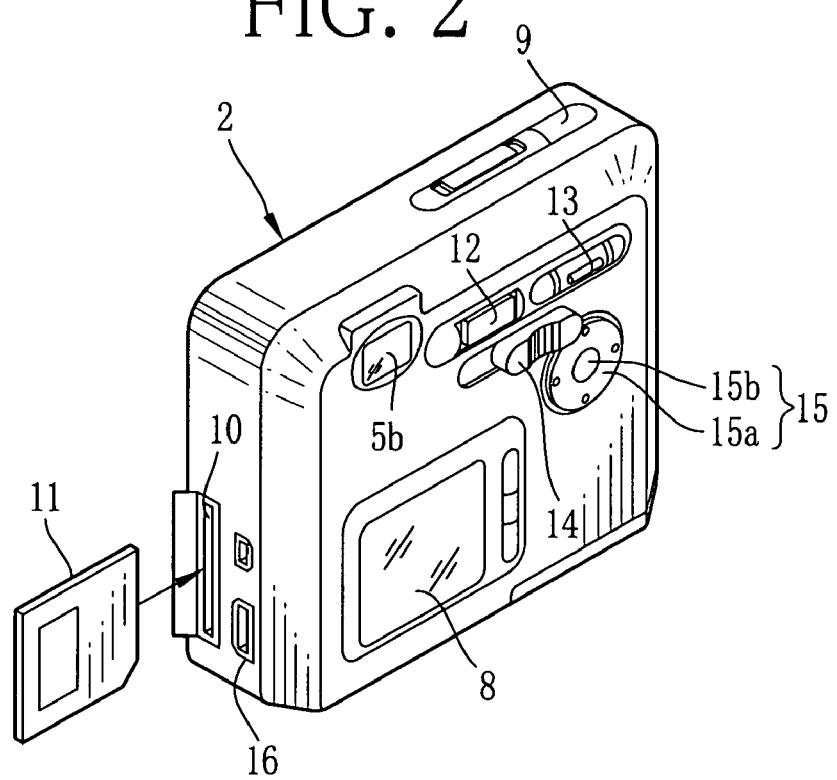
FIG. 2 is a perspective view of the digital camera viewed from the back.
Figure 3:
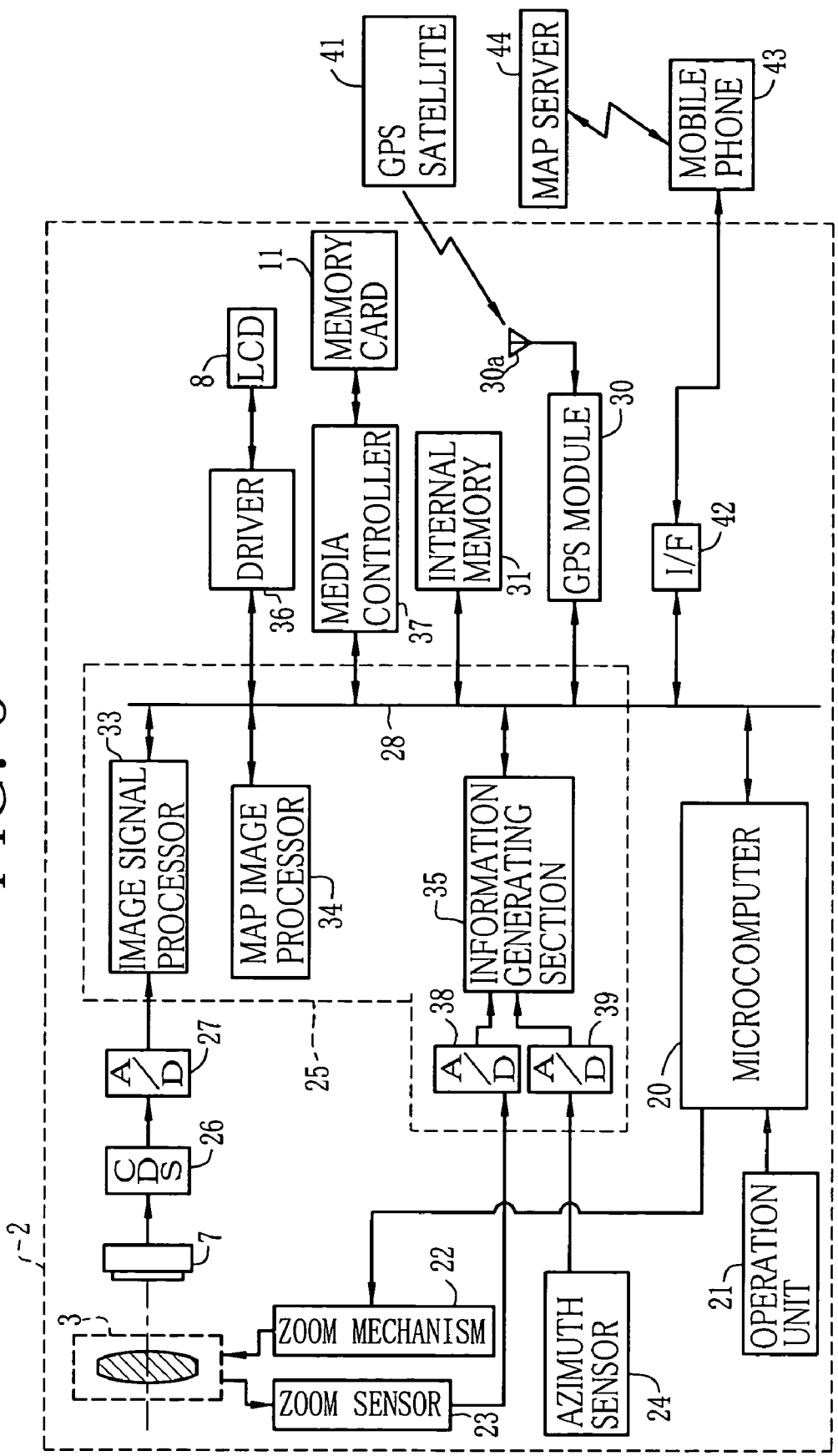
FIG. 3 is a block diagram showing an electrical configuration of the digital camera.

At the rear of the taking lens 3, a CCD image sensor 7 is disposed (see FIG. 3). An image captured by the CCD image sensor 7 during a framing is displayed as a so-called through image in an LCD (Liquid Crystal Display) 8 which is disposed at the back of the digital camera 2. The LCD 8 is used for reproducing the captured still image besides displaying the through image. In FIG. 2, a rear viewfinder window 5b of the optical viewfinder 5 is disposed at the back of the digital camera 2. Through the rear viewfinder window 5b, a user can observe the through images displayed on the LCD 8 and determine the framing using the optical viewfinder 5.

On an upper surface of the digital camera 2, a release button 9 is disposed. Still images are captured by pressing the release button 9. The captured still images are converted into image data and recorded in a memory card 11 inserted in a memory slot 10.

At the back of the digital camera 2 are disposed a power switch 12, a zoom button 13 for zooming the taking lens 3, a mode selector 14 for selecting various modes and an operation key section 15 for selecting an image to be reproduced and setting various settings in a setting screen displayed on the LCD 8. The operation key section 15 includes a cursor key 15a, which moves the cursor in four directions, and an enter key 15b.

Further, on a side of the digital camera 2, a connector 16 is provided for connecting the digital camera 2 to a mobile phone. As described later, the connector 16 is connected to the mobile phone through a cable and the mobile phone obtains map image data from an external map server.

As operation modes to be selected by operating the mode button 14, there are an image capture mode for capturing the still images, a reproduction mode for displaying the captured images recorded in the memory card 11 on the LCD 8 and a set up mode for setting various settings.

In the image capture mode, the digital camera 2 adds camera position information, camera azimuth information and focal distance information (hereinafter collectively called as additional information) to the image data and records the image data and the additional information in the memory card 11. In the reproduction mode, a map display mode, in which the map image according to the additional information is displayed along with the captured image on the LCD 8, can be turned on or off. When the map display mode is turned off, the captured image alone is displayed in the same manner as the conventional digital cameras.

In FIG. 3, a microcomputer 20 controls overall operation of each section of the digital camera 2. As it is well known, the microcomputer 20 is constituted of a CPU, a ROM, in which control programs and reference data are stored, and a RAM which stores results of various operations carried out by the CPU. An operation unit 21 consists of the release button 9, the power switch 12, the zoom button 13, the mode selector 14 and the operation key section 15. The microcomputer 20 controls the operation of each section according to operation signals from the operation section 21.

Focal distance of the taking lens 3 is changed by driving a zoom mechanism 22, which consists of a zoom motor and the like, in response to the operation of the zoom button 13. A zoom sensor 23 detects the focal distance of the taking lens 3 and outputs a zoom detection signal in accordance with the focal distance. Instead of using the zoom sensor 23, the microcomputer 20 may detect the zoom position (the focal distance of the taking lens 3) according to duration of the driving signal or the number of driving pulses to be output to the zoom motor. When an electronic zoom is used, the zoom position is determined by a set value of a zoom magnification.

An azimuth sensor 24 detects the camera azimuth. An electronic compass is used as the azimuth sensor 24, for instance. The azimuth sensor 24 detects the azimuth of a direction of an optical axis of the taking lens 3 and outputs an azimuth detection signal in accordance with the detected azimuth. Respective detection signals from the zoom sensor 23 and the azimuth sensor 24 are sent to a DSP (digital signal processor) 25.

After passing through the taking lens 3, subject light forms the subject image on a light receiving surface of the CCD image sensor 7. The subject image is converted into electrical charges in accordance with the light amount and stored. And then the stored charges are sequentially output as analog image signals, the voltage of which varies according to the amount of the stored charges. The CCD image sensor 7 has an electronic shutter function, which adjusts exposure time by controlling the charge storage time.

The analog image signals from the CCD image sensor 7 are input to an A/D converter 27 and converted into image data of red (R), green (G), and blue (B) after noise is removed in a CDS (Correlated Double Sampling) Circuit 26. The image data output from the A/D converter 27 is sent to the DSP 25.

A bus 28 interconnects the microcomputer 20, each section of the DSP 25, a GPS module 30 and an internal memory 31. Each section connected to the bus 28 is controlled by the microcomputer 20 via the bus 28, and each section directly sends and receives the data to each other.

The DSP 25 is constituted of an image signal processor 33, a map image processor 34, an information generating section 35 and the like, and performs various processing to the image data and the map image data under control of the microcomputer 20. The image data from the A/D converter 27 is input to the image signal processor 33.

To display the through image, the image signal processor 33 performs image processing such as gamma correction, white balance correction and contrast correction to the image data sent from the A/D converter 27, and sends the processed image data to a driver 36.

When the still image is captured, the image processor 33 performs YC conversion and compression processing in addition to the above image processing. In the YC conversion, the image data of R, G and B are converted into the image data of a luminance signal Y and color difference signals, Cb and Cr. In the data compression processing, the image data is compressed into a predetermined compression format, for instance, in JPEG format. Further, the image signal processor 33 adds the additional information to the image data as a tag. The image data, to which the additional information is added, is sent to the media controller 37.

Further, in a reproduction mode, the image signal processor 33 performs decompression processing, in which the image data read from the memory card 11 is decompressed, and RGB conversion, in which the image data of Y, Cb and Cr is converted into that of R, G and B, and writes the image data and the additional information to the internal memory 31. Thereafter, the image data is sent to the driver 36 of the LCD 8.

The map image processor 34 performs map image processing for displaying the captured image and the map image which is based on the additional information added to the captured image. As the map image processing, there are modification in a display magnification of the map image, processing for adjacently displaying the map image and the captured image and processing for fitting guide information such as an image capture point, which indicates the camera position, on the map image.

To the information generating section 35, the zoom detection signals from the zoom sensor 23 and azimuth detection signals from the azimuth sensor 24 are inputted through A/D converters 38 and 39 respectively. The image generating section 35 generates focal distance information, which indicates the focal distance of the taking lens 3, and camera azimuth information, which indicates the camera azimuth, based on the zoom detection signal and the azimuth detection signal respectively. Further, when the electronic zoom, which changes the quasi-focal distance is used, the focal distance information is generated from the quasi-focal distance.

The GPS module 30 is provided as a position detecting section for detecting the camera position. At the time of capturing the still image, the GPS module 30 detects a position of the digital camera 2, that is, the latitude and longitude of the camera position, by receiving signals from plural GPS satellites 41 via an antenna 30a and outputs the camera position information.

The focal distance information and the camera azimuth information from the information generating section 35, and the camera position information from the GPS module 30 are sent to the image signal processor 33 and added to the corresponding image data as the tag.

In the internal memory 31, the image being processed for recording in the memory card 11, the image data of an image frame being reproduced and the corresponding additional information are recorded. Further, the map image data obtained from an external server is written in the internal memory 31. The various recorded data is read by the microcomputer 20, the image signal processor 33, and the map image processor 34 in accordance with the processing.

The driver 36 drives the LCD 8 according to the input data. In the image capture mode, the image data from the A/D converter 27 is processed in the image signal processor 33, and sent to the driver 36. Thereby the through image is displayed on the LCD 8. Further, when the map display mode is turned off in the reproduction mode, the image data is read from the memory card 11 and the decompression processing and the RGB conversion are performed to the image data in the image signal processor 33. Thereafter, the image data is sent to the driver 36 and thus the captured image recorded in the memory card 11 is displayed on the LCD 8.

When the map display mode is turned on, the captured image and the corresponding map image, and various guide information are displayed on the LCD 8 by sending the data from the map image processor 34 to the driver 36.

The media controller 37 carries out the reading and writing of the data from and to the memory card 11. In the image capture mode, the image data of one frame, which is captured in response to pressing the release button 9, is input from the image signal processor 33 to the media controller 37, and recorded in the memory card 11. Further, in the reproduction mode, the media controller 37 reads the image data from the memory card 11 and sends the image data to the image signal processor 33. Furthermore, instead of using the memory card 11, the internal memory and the like can also be used as the recording medium.

An I/F (interface) circuit 42 has the connector 16 (see FIG. 2), and is connected to a mobile phone 43 through the connector 16. When the map display mode is turned on, the microcomputer 20 communicates with an external map sever 44 through the I/F circuit 42 and the mobile phone 43 and the map image data of the map image to be displayed is obtained according to the additional information. The obtained map image data is written to the internal memory 31, and read by the map image processor 34.

The map server 44 stores the map image data for displaying the map image in the digital camera 2. In the map image data, mountains, rivers and major buildings are recorded as map symbols along with the position information and textual information such as names and the like.

It is also possible to previously record the map image data in the internal memory of the digital camera 2. However, obtaining the map image data from the external map server via a communication means such as the mobile phone 43 makes unnecessary to incorporate a mass memory. It is also possible to incorporate the communication means such as the mobile phone 43 into the digital camera 2. Further, a memory card, in which the map images are recorded, can be inserted in the memory slot 10 of the digital camera 10. In that case, it is preferable to dispose plural memory slots 10 so that the memory card, in which the map images are recorded, and the memory card 11 for recording the captured images can be inserted at the same time.

Figure 4:
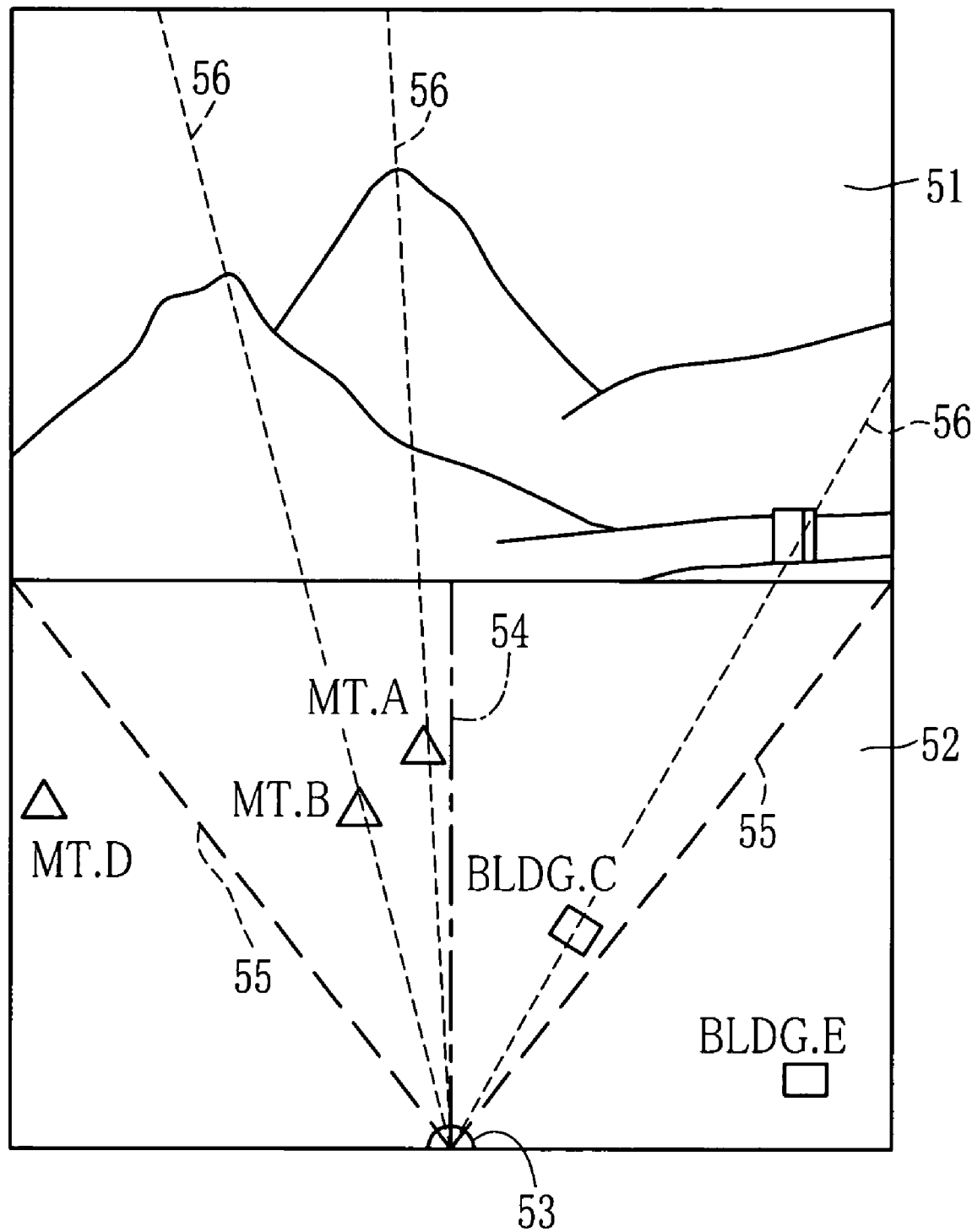
FIG. 4 is an explanatory view showing a display condition of a map image, when a focal distance of a taking lens is short.
Figure 5:
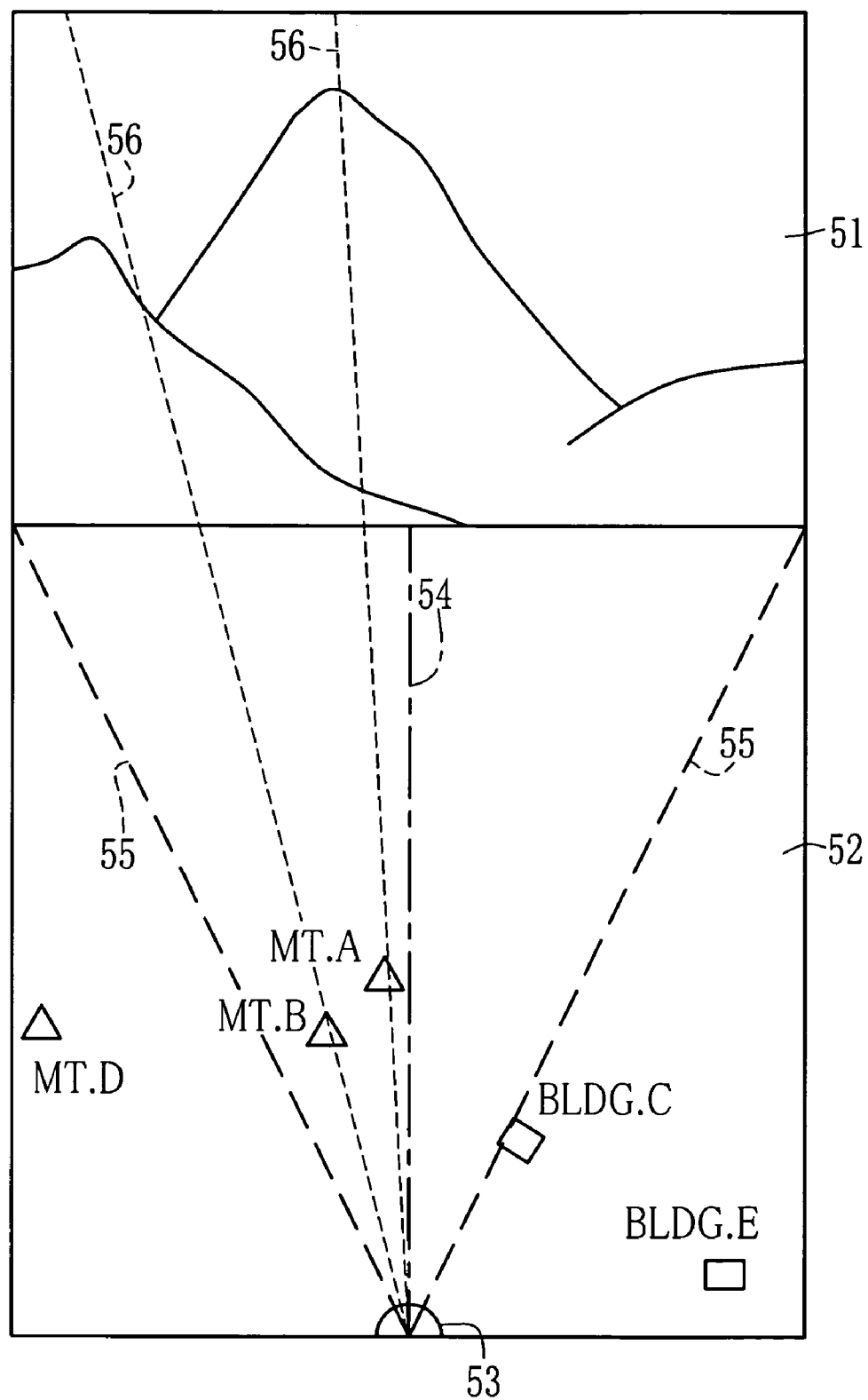
FIG. 5 is an explanatory view showing the display condition of the map image, when the focal distance of the taking lens is long.
Figure 6:
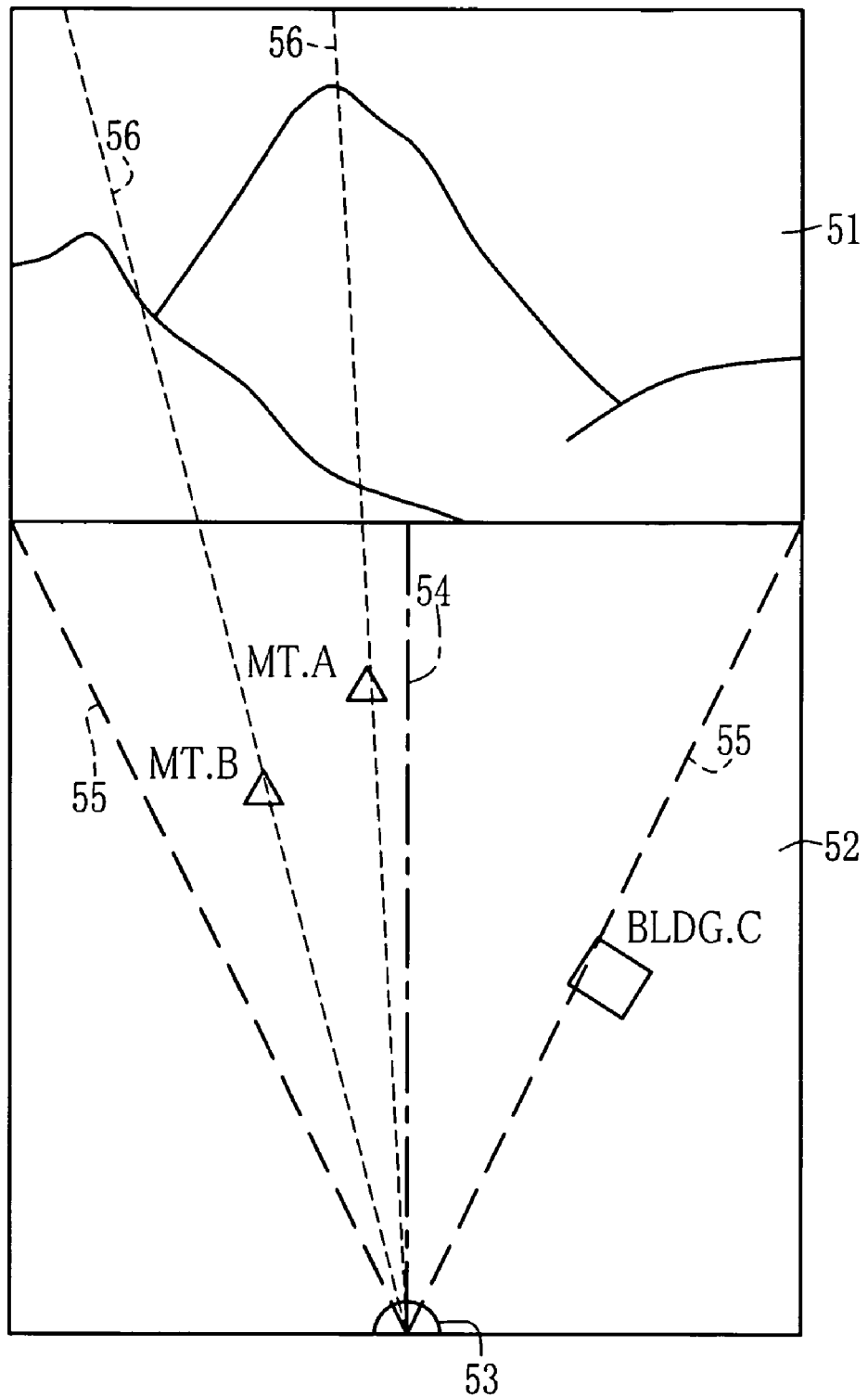
FIG. 6 is an explanatory view showing the display condition of the map image, when the focal distance of the taking lens is long and a display magnification is high.

FIGS. 4-6 illustrates display examples of the map images 52 processed by the map image processor 34. FIG. 4 illustrates the display example of the map image when the focal distance of the taking lens 3 is short. FIG. 5 illustrates the display example of the map image when the focal distance is long. FIG. 6 illustrates the display example in which the display magnification of the map image is increased with respect to that in FIG. 5.

In the map display mode, a reproduced image frame 51 and a map image 52, which is based on the additional information of the image frame 51, are displayed adjacent in an up-and-down direction. That is, the map image 52 is disposed below the image frame 51. Both the image frame 51 and the map image 52 are displayed in a rectangular display area, and both images are displayed in the same length in a horizontal direction. Further, a lower side of the image frame 51 and the upper side of the map image 52 coincide with each other.

The map image 52 is a planimetric map in which the map symbols and the names of the mountains, the rivers, the buildings and the like are indicated. The map image 52 covering an area from the camera position toward the subject is displayed according to the camera azimuth information and the camera position information. The range displayed in the map image 52 is determined by the microcomputer 20 in accordance with the display magnification, which is arbitrarily set, and the display size of the map image 52. In the example, a vertical length of the map image 52 is varied in accordance with the focal distance information such that the vertical length of the map image 52 becomes longer as the focal distance is increased.

In the map display mode, an image capture point 53, an optical axis line 54, a pair of field view lines 55 and extension lines 56 are displayed along with the map image 52. The image capture point 53 indicates the camera position where the image frame 51 has been captured. The map image 52 is displayed in such a way that the image capture point 53 is placed in a center of the lower edge of the map image 52. The optical axis line 54 in the map image 52 corresponds to an optical axis of the taking lens 3 at the time of exposure. The optical axis line 54 is displayed in a line from the image capture point 53 to a center of the upper edge of the map image 52. Therefore, the map image 52 is displayed such that the camera azimuth is up in the map image 52.

A pair of field view lines 55 indicate a range of view angle determined by the focal distance of the taking lens 3, that is, the image capture field. The pair of field view lines 55 has the same angle as the horizontal angle of view at the time of exposure, and is symmetric with respect to the optical axis line 54.

Figure 14A:
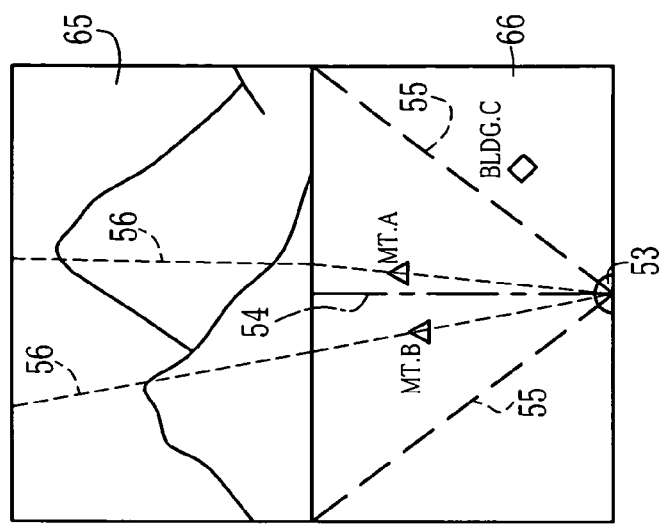
FIG. 14 is an explanatory view showing an example of displaying the map image along with a through image while updating the map image in the image capture mode.
Figure 14B:
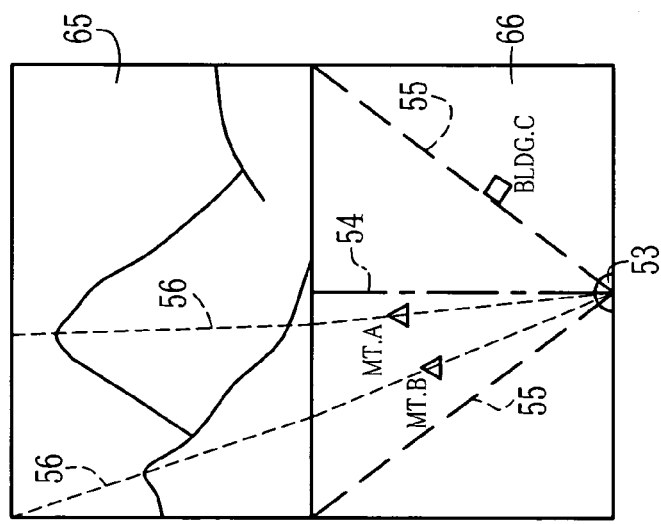
Figure 14C:
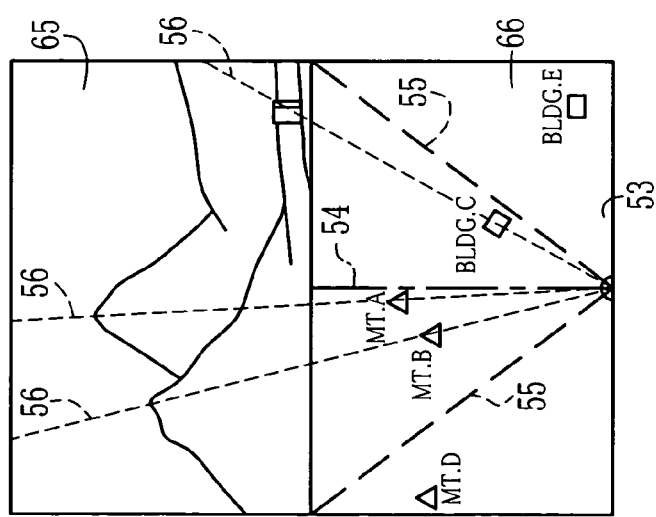

In the above example, the vertical direction of the map image 52 is changed in accordance with the focal distance at the time of exposure. However, it is also possible to coincide the range indicated by the pair of field view lines 55 with the image capture field by changing the display magnification in the horizontal or vertical direction without changing the horizontal and vertical lengths of the map image 52 as shown in FIGS. 14A, 14B and 14C, which will be described later.

It is also possible to display the map image 52 of only a range of view angle so as to emphasize the range of view angle. In that case, the map image 52 is displayed in a triangular shape, and the boundaries correspond to the field view lines 55.

The extension line 56 is displayed to make the correspondence between the map symbol displayed in the map image 52 and the subject in the image frame 51 clear. The extension line 56 is a linear line which starts from the image capture point 53 and extends to the upper edge of the image frame 51 through the map symbol in the range of view angle and the subject in the image frame 51.

It is preferable to display the extension line 56 in a complementary color so as to be easily recognized. Further, the extension line 56 can also be displayed between the image capture point 53 and an arbitrary point set by the user.

The display magnification of the map image 52 is changeable by operating the operation key section 15. The display range of the map image 52 is enlarged or reduced with respect to the image capture point 53 by changing the display magnification. When the display magnification is reduced, for instance, the display range of the map image 52 is enlarged as shown in FIG. 5. When the display magnification is increased, details of the map image 52 are enlarged as shown in FIG. 6.

Figure 7:
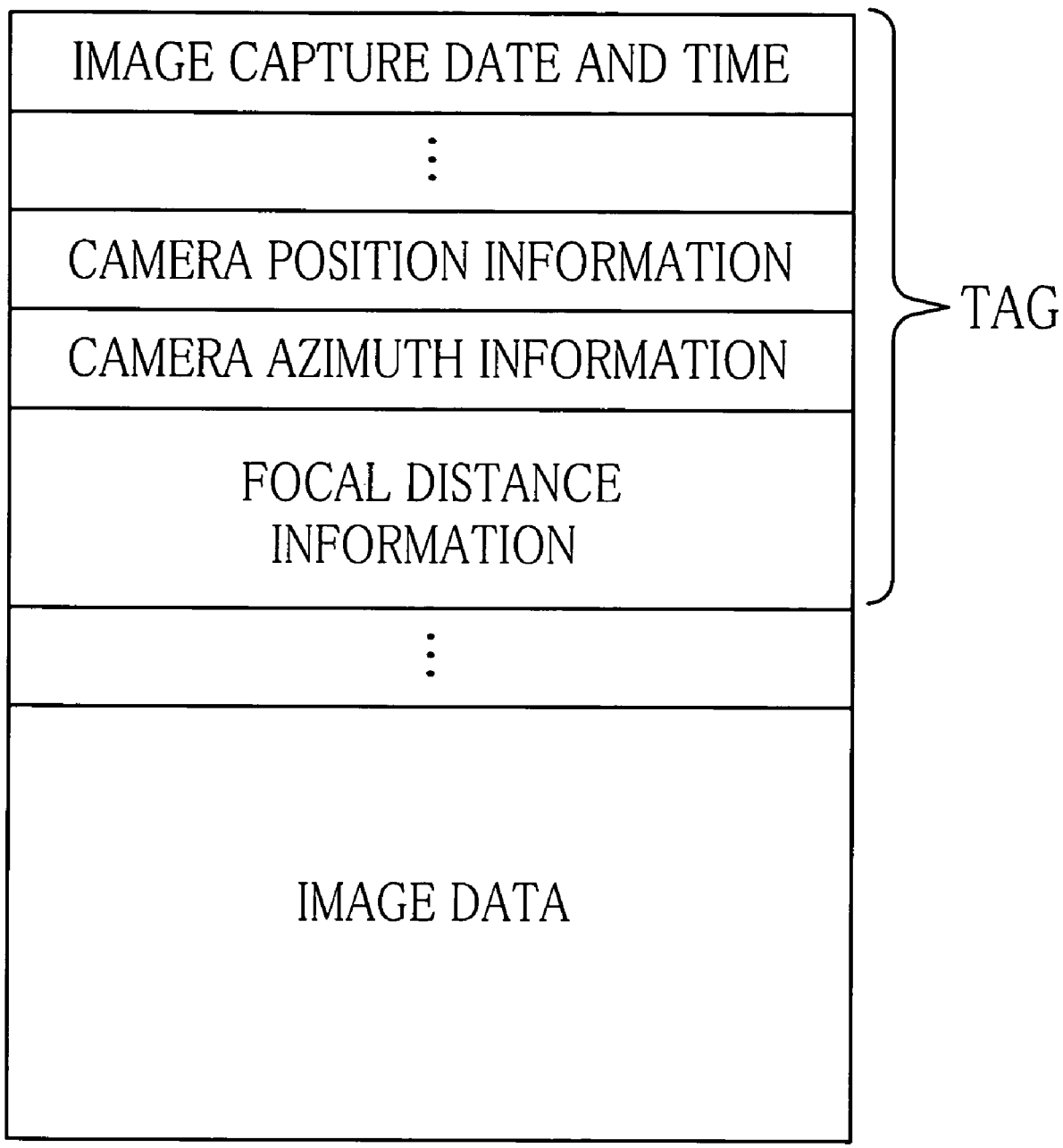
FIG. 7 is an explanatory view showing information recorded in a tag.

The recording structure of the tag is schematically illustrated in FIG. 7. An image data format, a folder structure and the like of the digital camera 2 comply with DCF (Design rule of Camera File System) standard. The digital camera 2 uses the EXIF (Exchangeable Image File) format for the image file.

In the EXIF format, a tag such as the image capture date is normally added to the image data. In addition to the normal tag, the digital camera 2 adds the tag such as the camera position information, the camera azimuth information and the focal distance information as described above.

Next, an operation of the above configuration is described. To capture the still image, the framing is determined through the optical viewfinder 5 or by observing the LCD 8 in which the through image is displayed. At that time, if the zoom button 13 is operated, the zoom mechanism 22 carries out the zooming of the taking lens 3 and the focal distance is changed. The image is captured by pressing the release button 9 after the framing is determined.

Figure 8:
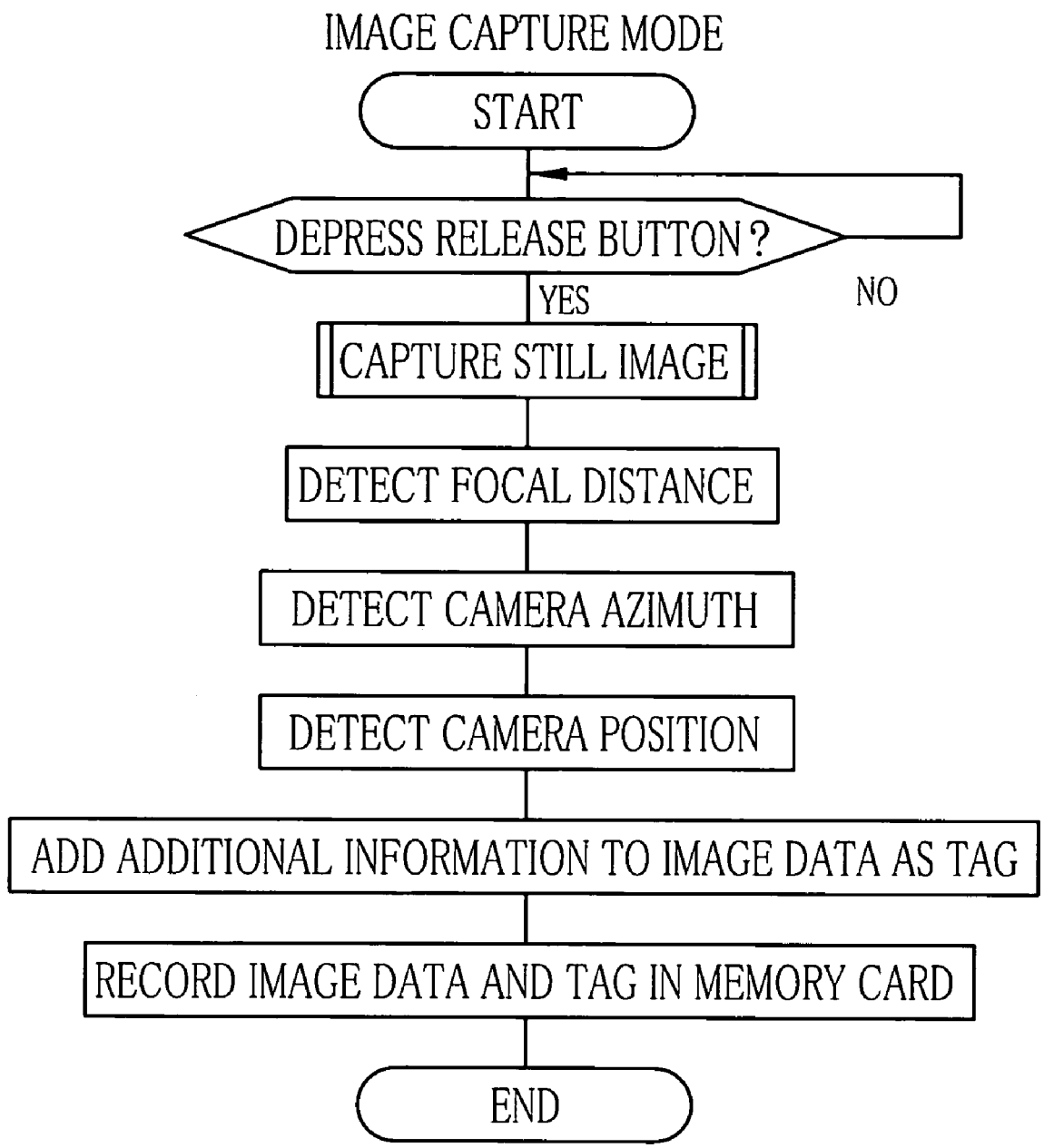
FIG. 8 is a flow chart showing steps for capturing a still image.

As shown in FIG. 8, the still image is captured by the CCD image sensor 7 upon pressing the release button 9 in the same way as the conventional digital cameras. The image data of one frame obtained by the exposure is sent from the A/D converter 27 to the image signal processor 33. In the image signal processor 33, the image processing such as the gamma correction, the white balance correction and the contrast correction, and the YC conversion are performed. Thereafter, the compression processing is performed, which compresses the data in JPEG format. The compressed image data is written in the internal memory 31.

The zoom detection signal output from the zoom sensor 23 upon capturing the still image is input in the information generating section 35 through the A/D converter 38, and converted into the focal distance information which indicates the focal distance of the taking lens 3 at the time of the exposure. Further, the azimuth detection signal from the azimuth sensor 24 is input in the information generating section 35 via the A/D converter 39 and output as the camera azimuth information which indicates the azimuth of the optical axis of the taking lens 3. The focal distance information and the camera azimuth information are sent to the image signal processor 33.

Further, upon pressing the release button 9, the GPS module 30 is actuated. The GPS module 30 receives signals from the plural GPS satellites 41. The latitude and longitude of the camera position is calculated according to the signals. The camera position information is sent to the image signal processor 33.

As described above, after the focal distance information, the camera azimuth information and the camera position information are input, the image signal processor 33 adds the each of the above information to the image data, which is written in the internal memory 31, as the tag, and sends the image data to the media controller 37. Thereby, the image data, to which the additional information is added, is recorded in the memory card 11.

Thereafter, every time the release button 9 is pressed, the captured image is recorded in the memory card 11 along with the additional information (the focal distance information, the camera azimuth information and the camera position information).

Figure 9:
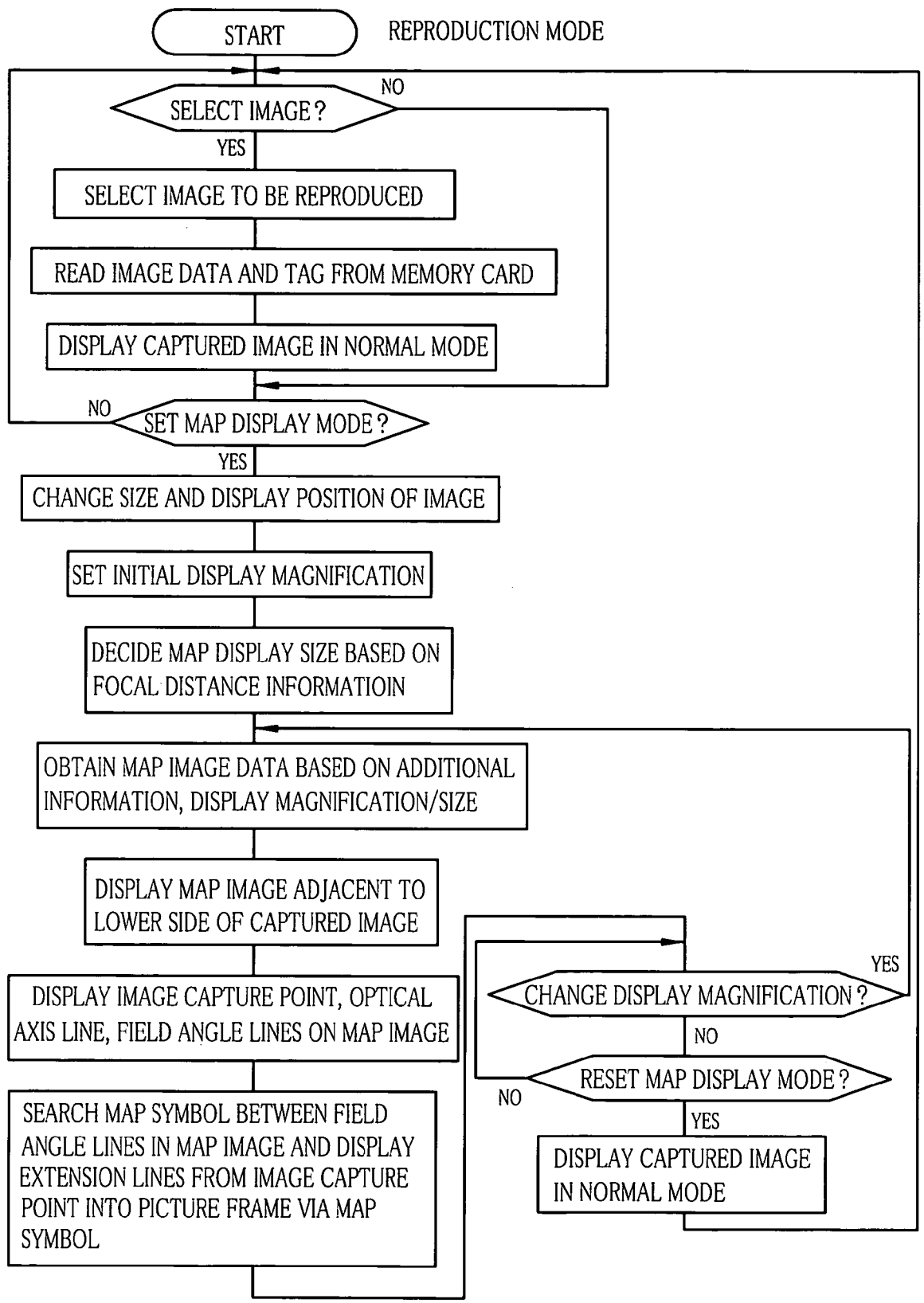
FIG. 9 is a flow chart showing steps for displaying the captured image in a reproduction mode.

To reproduce the captured image, a reproduction mode is selected by operating the mode selector 14. Then, the captured image to be reproduced (that is, the image frame) is selected as shown in FIG. 9. The media controller 37 reads the selected image data of the selected captured image from the memory card 11.

The image data is sent to the image signal processor 33, and the image data is separated into the tag and the image data of the still image. The image data, to which the decompression processing and the RGB conversion are performed, and the additional information are written in the internal memory 31. Thereafter, the image data is read from the internal memory 31 and sent to the driver 36. Thereby, the captured image recorded in the memory card 11 is displayed on the LCD 8 (a normal display mode).

The image data read from the memory card 11 is sequentially switched by operating the operation key section 15. The image data and the additional information in the internal memory 31 are rewritten in the same steps as above.

To check the names and locations of the mountains, the buildings and the like in the captured image, the map display mode is turned on by operating the operation key section 15 while displaying the captured image on the LCD 8 in the normal display mode.

When the map display mode is turned on, the map image processor 34 changes the display position and the display size of the captured image to display the map image on the LCD 8. Thereafter, the microcomputer 20 sets the display magnification of the map image as an initial display magnification in the map display processor 34. Further, the microcomputer 20 reads the additional information from the internal memory 31, and determines the display size of the map image according to the focal distance information.

Thereafter, the microcomputer 20 calculates the area of the map image to be displayed according to the display magnification, the additional information and the display size. Then, the area information according to the calculation results is sent to the map server 44 via the I/F circuit 42 and the mobile phone 43. The map server 44 sends the map image data according to the area information. The mobile phone 43 receives the map image data from the map server 44, and the received data is written in the internal memory 31 via the I/F circuit 42. It is also possible to previously receive the map image data covering a wide area to cope with the changes in the display magnification.

Once all the map image data is completely received, the microcomputer 20 sends the additional information, the display size and a command to display the map image to the map image processor 34. The map image processor 34 reads the map image data from the internal memory 31, performs the processing of the map image data according to the designated image display size, the display magnification, and the camera azimuth to be up in the map image, and send the map image data to the driver 36. Thereby, as shown in FIG. 4, the map image 52 is displayed below the image frame 51. At that time, the image capture position is placed at the center of the lower edge of the map image 52 (the image capture point 53).

Next, the map image processor 34 displays the image capture point 53, and the optical axis line 54, which extends from the image capture point 53 along the direction of the camera azimuth on the map image, by partly rewriting the data in VRAM (not shown) in the driver 36 which stores the data to be displayed. In the same manner, the map image processor 34 displays the pair of field view lines 55 which extend from the image capture point 53 to the ends of the upper edge of the map image 52 respectively. The angle between the pair of field view lines 55 becomes equal to the horizontal angle of view at the time of capturing the image 51 since the aspect ratio of the displayed map image 52 is determined according to the focal distance information.

After displaying the image capture point 53, the optical axis line 54 and the field view line 55, the map image processor 34 accesses the map image data in the internal memory 31 and search the map symbol within the range of view angle. Upon finding the map symbol, the data in the VRAM in the driver 36 is partly rewritten so as to display the extension line 56 which extends from the image capture point 53 to the image frame 51 through the map symbol.

It is also possible to generate image data to be displayed on the LCD 8, which is a combination of the image frame 51, the map image 52 and the various guide information, in the internal memory 31 and send the image data to the driver 36.

As described above, the image frame 51, the map image 52, the image capture point 53, the optical axis line 54, the field view lines 55 and extension lines 56 are displayed on the LCD 8. Such display enables the user to easily recognize the map symbol and the name in the map image 52, which correspond to the subject in the image frame 51. Even if the plural subjects are captured in the image frame 51, the name of each subject is easily recognized.

In case the display area of the map image is narrow so that the subject in the captured image is not included in the map image, or the map symbols are densely packed so that the distinction is difficult, the operation key section 15 is operated to change the display magnification.

When the display magnification is increased, the map image processor 34 generates new map image data according to the instructions from the microcomputer 20. To generate the new map image data, the map image processor 34 reads the map image from the internal memory 31 and enlarges the map image data by the designated display magnification with respect to the image capture point, and crops the map image in the display size according to the focal distance information. The generated new map image data is sent to the driver 36. Thereafter, the image capture point 53, the optical axis line 54, the field view lines 55 and the extension lines 56 are displayed in the same manner as above. Thus, for instance, the display condition in FIG. 5 is changed to that in FIG. 6.

When the display magnification is reduced, the microcomputer 20 judges whether the map image data is displayable at the designated display magnification using the map image data which is previously received from the map server 44 and recorded in the internal memory 31. When the image data is displayable, the microcomputer 20 instructs the map image processor 34 to reduce the map image data. In case the map image data is not displayable, the microcomputer 20 communicates with the map server 44 via the mobile phone 43, and receives the map image data to make up for the (deficiency) and then instructs the map image processor 34 to reduce the size of the map image. Thus, for instance, the display condition in FIG. 6 is changed to that in FIG. 5.

In the above embodiment, the captured image and the map image are displayed together; however, it is also possible to display the map image alone.

Figure 10:
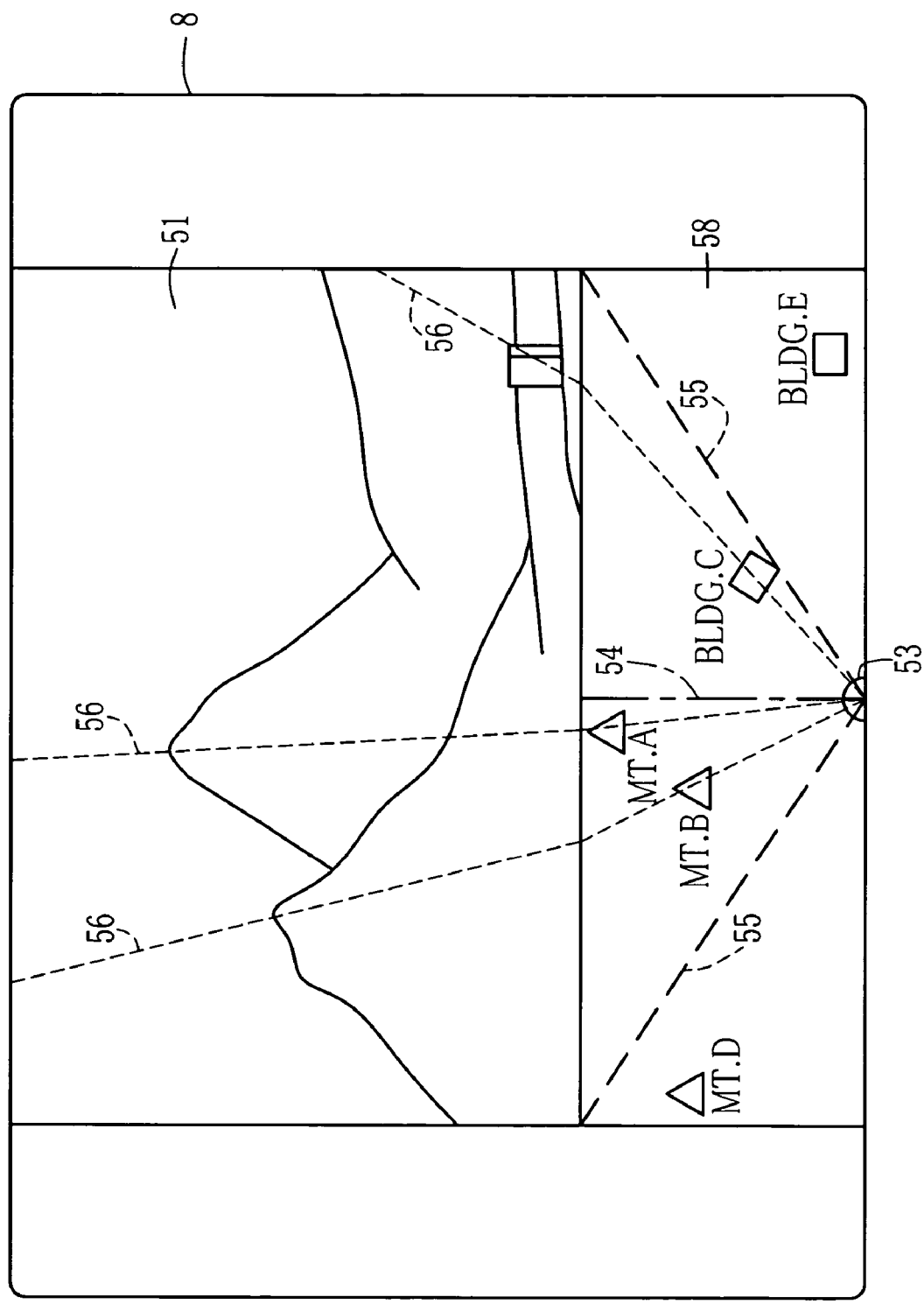
FIG. 10 is an example for displaying the map image whose size is reduced in a vertical direction.

FIG. 10 illustrates an example for displaying the map image whose size is reduced in the vertical direction, that is, the direction of the optical axis. The following example is similar to the above embodiment. Substantially equal components have the same numerals as the above embodiment and the explanation is omitted.

In this example, the map image processor 34 performs processing to reduce the size of a map image in the vertical direction. The map image 58, whose display magnification in the vertical direction is reduced with respect the horizontal direction, is displayed on the LCD 8. Further, the extension line 56, which shows the correspondence between the map symbol and the subject in the image frame 51, is bent at the boundary of the map image 58 and the image frame 51.

Thus, when the map image 58 is displayed in the reduced size, the image frame 51 can be displayed in a larger size on the LCD 8 that the image frame 51 can be easily observed. The angle between the field view lines 55 in the map image 52 does not coincide with the actual view angle; however, the range of view angle in the display coincides with the actual one.

Figure 11:
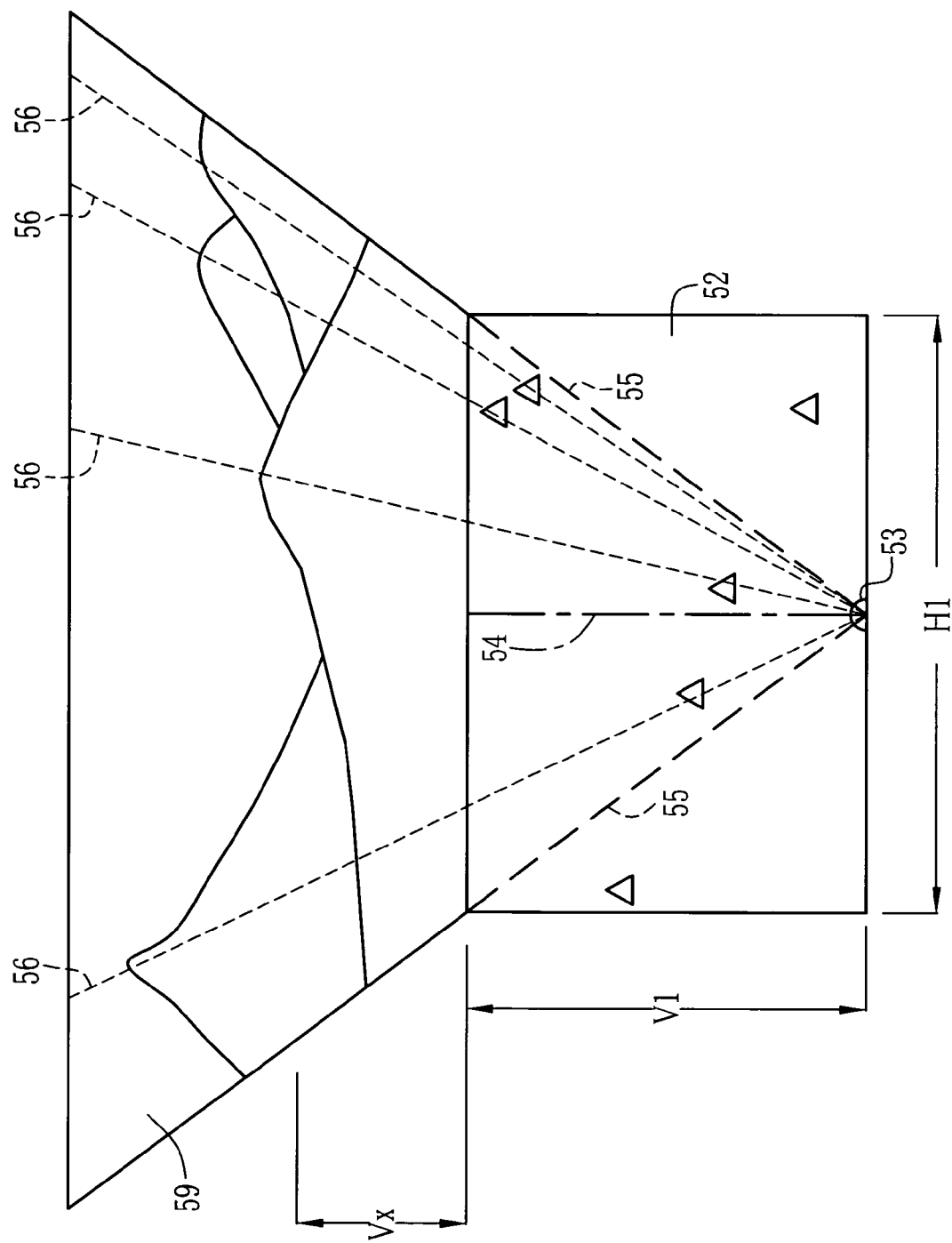
FIG. 11 is an example of displaying the captured image which is deformed.

FIG. 11 illustrates an example in which the relationship between the map symbol in the map image and the subject in the image frame becomes more apparent by deforming the image frame to be displayed with the map image. The following example is similar to the above embodiment. Substantially equal components have the same numerals as the above embodiment and the explanation is omitted.

In this example, an image frame 59 is deformed to the trapezoidal shape between the field view lines 55 which extend from the map image 52 by the map image processor 34. That is, the display magnification of the image frame 59 is gradually increased from the bottom to the top in the horizontal direction. The magnification ratio, as shown in FIG. 11, is linearly increased to satisfy $1+Vx/V1$ at a given position in the vertical direction, when H1 is a length of the upper edge of the map image 52, V1 is a length in the vertical direction of the map image 52, Vx is a position in the vertical direction (a length between the lower edge of the image frame 59 and the given position in the image frame 59 in the vertical direction), and the magnification ratio of the lower edge of the image frame 59 is 1. Further, an interpolation and enlargement method can be used for enlarging the image frame 59.

As described above, a difference between a position to be indicated by the extension line 56 and the actual display position in the upper portion of the image frame 59 can be reduced by displaying the deformed image frame 59. Thus, even if the map symbols are densely packed in the map image 52, the correspondence between the map symbol and the subject in the image frame 59 is appropriately distinguished.

Figure 12:
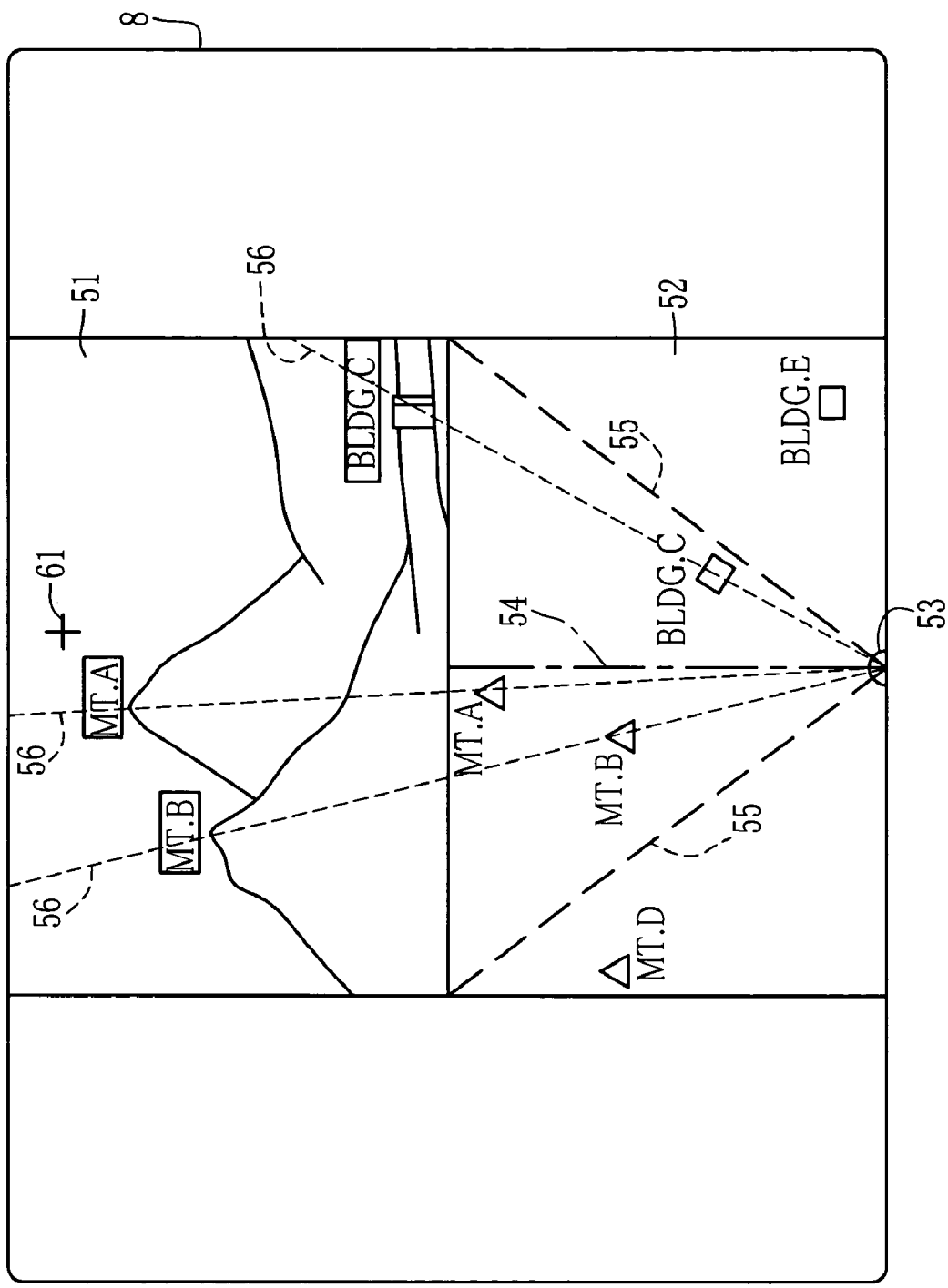
FIG. 12 is an example of fitting names to subjects on the captured image.

FIG. 12 illustrates an example in which textual information such as the names of the subjects are added to the image frame 51 and recorded and stored with the image frame 51. The following examples are similar to the above embodiment. Substantially equal components have the same numerals as the above embodiment and the explanation is omitted.

The map image processor 34 records the correspondence between the extension line 56 and the name of the subject in the internal memory 31, for instance. Further, in the image frame 51 on the LCD 8, a cursor 61 for designating an arbitrary position is displayed by the microcomputer 20. The cursor 61 is moved within the image frame 51 by the operation of the cursor key 15*a* of the operation key section 15, and a position of the cursor 61 is input upon pressing the enter key 15*b*.

The determined position of the cursor 61 by operating the enter key 15*b* is sent from the microcomputer 20 to the map image processor 34. When the cursor position information is input, the map image processor 34 detects the presence of the extension line 56 near the input position of the cursor 61. When the extension line 56 is near the input position of the cursor 61, the name of the map symbol corresponding to the extension line 56 is read from the memory 31. The image data, in which the name is fit to a position in the image frame 51 according to the cursor position information, is generated in the internal memory 31 and displayed on the LCD 8.

For instance, when the enter key 15*b* is pressed upon placing the cursor 61 on the extension line 56 at a position close to a summit of the mountain in the center of the image frame 51 shown in FIG. 12, the name of the mountain "Mt. A" which correspond to the extension line 56 is fit to the position of the cursor 61.

Thereafter, the operation unit 21, for instance the release button 9, is pressed, the image data, to which the name is fit, is read by the image signal processor 33 and the YC conversion and the compression processing are performed to the image data. Thereafter, the image data is sent to media controller 37 and recorded in the memory card 11. The fit image is recorded as a different image data from the original image data of the captured image. Thus, the name can be readily fit to the subject in the captured image, and stored.

It is also possible to fit the names in the deformed image such as FIG. 11, and store the fit image data. Further, various textual information, for instance, altitudes of the mountains and the like can be fit to the image data in addition to the names. Furthermore, the guide information such as the extension line 56 and the like, and the map image data can be stored together.

Figure 13:
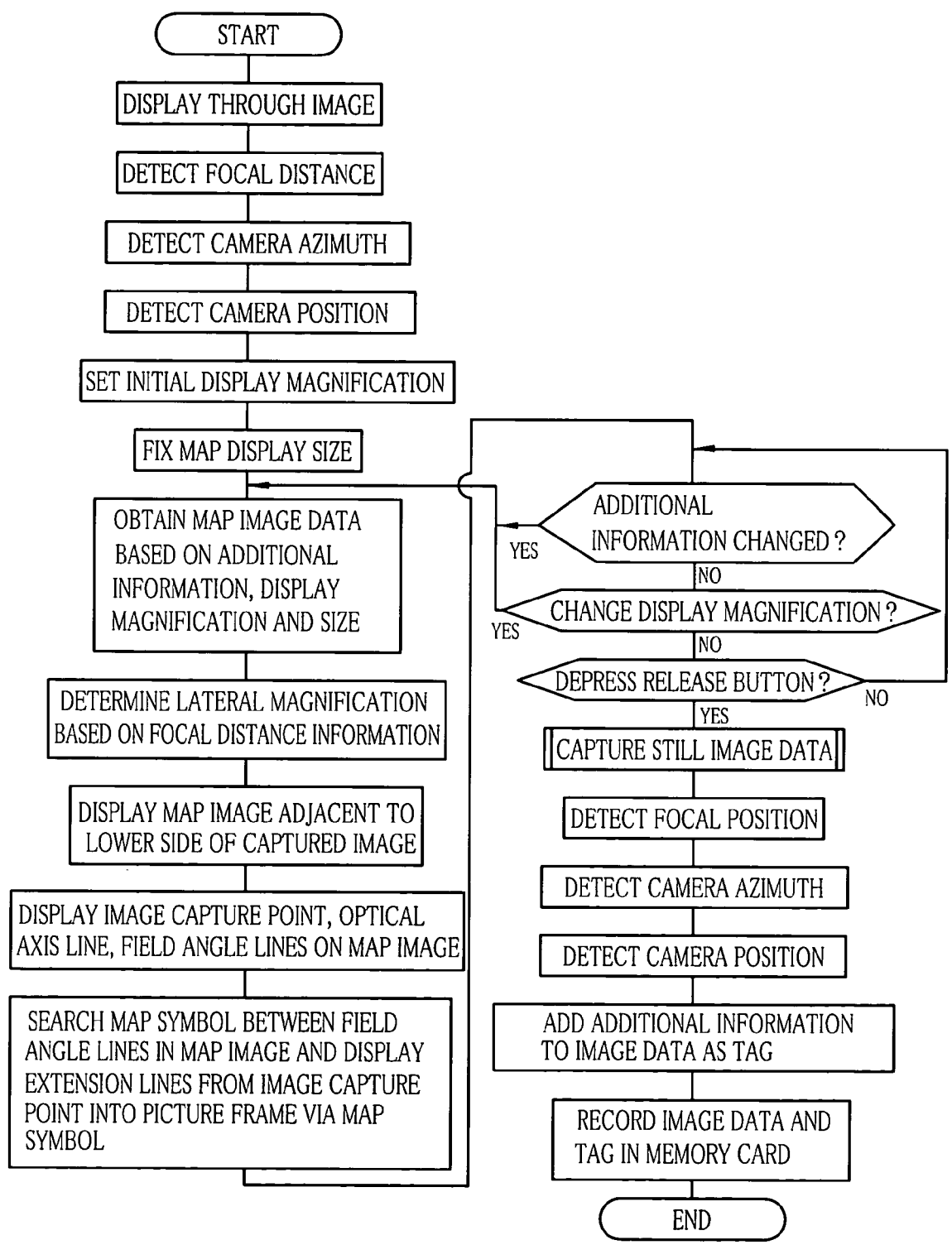
FIG. 13 is a flowchart showing steps for capturing the image with updating the displayed map image in an image capture mode.

FIGS. 13, 14A, 14B and 14C illustrate examples for displaying the through image and the corresponding map image together. FIG. 13 illustrates the steps for displaying the map image in the example. FIG. 14A illustrates the display example when the taking lens 3 is in a wide range. FIG. 14B illustrates the display example in which the taking lens 3 is zoomed from the wide angle in the framing condition shown in FIG. 14A to the tele angle. FIG. 14C illustrates the display example in which the image capturing direction is changed from the framing condition shown in FIG. 14B. The following examples are similar to the above embodiment. Substantially equal components have the same numerals as the above embodiment and the explanation is omitted.

In the image capture mode, the measurement and the detection are continuously carried out by the zoom sensor 23, the azimuth sensor 54 and the GPS module 30, and additional information is sent to the microcomputer 20. The microcomputer 20 periodically monitors the additional information. When there is a change in the additional information, the microcomputer 20 calculates the display size of the map image and the covering area in the map image, which corresponds to the set the display magnification. Next, it is checked whether the necessary map image data for displaying the covering area on the map image has been written in the internal memory 31 or not. When the covering area is displayable, the microcomputer 20 instantly instructs the map image processor 34 to update the map image. When the map image is not displayable, the map image data, corresponding to the deficient portion of the covering area, is received from the map server 44 and written in the internal memory 31. Then, the microcomputer 20 instructs the map image processor 34 to update the map image. At the same time, the additional information is sent from the microcomputer 20 to the map image processor 34.

In case the map image data is received from the external server, there is a considerable delay in displaying the map image when the map image data is received and updated in response to each of changes in the additional information. Therefore, it is preferable to obtain the wider area of the map image with respect to the camera position than the actual display area of the map image. It is also possible to insert the memory card, in which the map image data is previously recorded, to the digital camera 2.

Upon receiving the instruction of updating the map image, the map image processor 34 updates the map image displayed on the LCD 8 by reading the map image data from the internal memory 31 and modifying the map image data according to the additional information, the display magnification and the display size sent from the microcomputer 20. Thus, the map image is updated in response to the changes in the additional information.

In FIG. 14A, a map image 66 is displayed below a through image 65. Further, the image capture point 53, the optical axis line 54, the field view lines 55 and the extension lines 56 are displayed along with the map image 66. The through image 65 and the map image 66 are displayed in rectangular shapes in the same manner as the first embodiment, and have the same length in the horizontal direction. However, regardless of the focal distance of the taking lens 3, the display size of the map image 66 is fixed, and the field view lines 55 are displayed such that the field view lines 55 extend from the image capture point 53, which is placed at the center of the lower edge of the map image 66, to the ends of the upper edge of the map image 66. Accordingly, the map image processor 34 fixes the display magnification in the vertical direction, and increases or decreases the display magnification in the horizontal direction with respect to the vertical direction in accordance with the focal distance.

In the example, as shown in FIG. 14A, when the taking lens 3 is in the wide edge, the vertical and horizontal directions of the displayed images are of the same display magnification. As shown in FIGS. 14B and 14C, when the taking lens 3 is zoomed to the tele angle, the display magnification in the horizontal direction is increased. Thereby, the range of view angle between the pair of the field view lines 55 corresponds to the focal distance while the angle between the field view lines 55 is fixed. Further, as the display magnification in the horizontal direction increases, the extension line 56 is bent at the boundary between the map image 66 and the through image 65 to keep the correspondence between the map symbol and the subject in the through image 65.

In the example, when the focal distance of the taking lens 3 changes, the display magnification changes in the horizontal direction of the map image 66 as shown in FIGS. 14A and 14B. Further, when the framing is changed, the map image 66, which is moved with respect to the image capture point 53, is displayed as shown in FIGS. 14B and 14C. When the image capture point is moved, the map image 66 is updated accordingly. Thus, it becomes possible to capture the image after checking whether the intended subject is inside the range of view angle.

Figure 15:
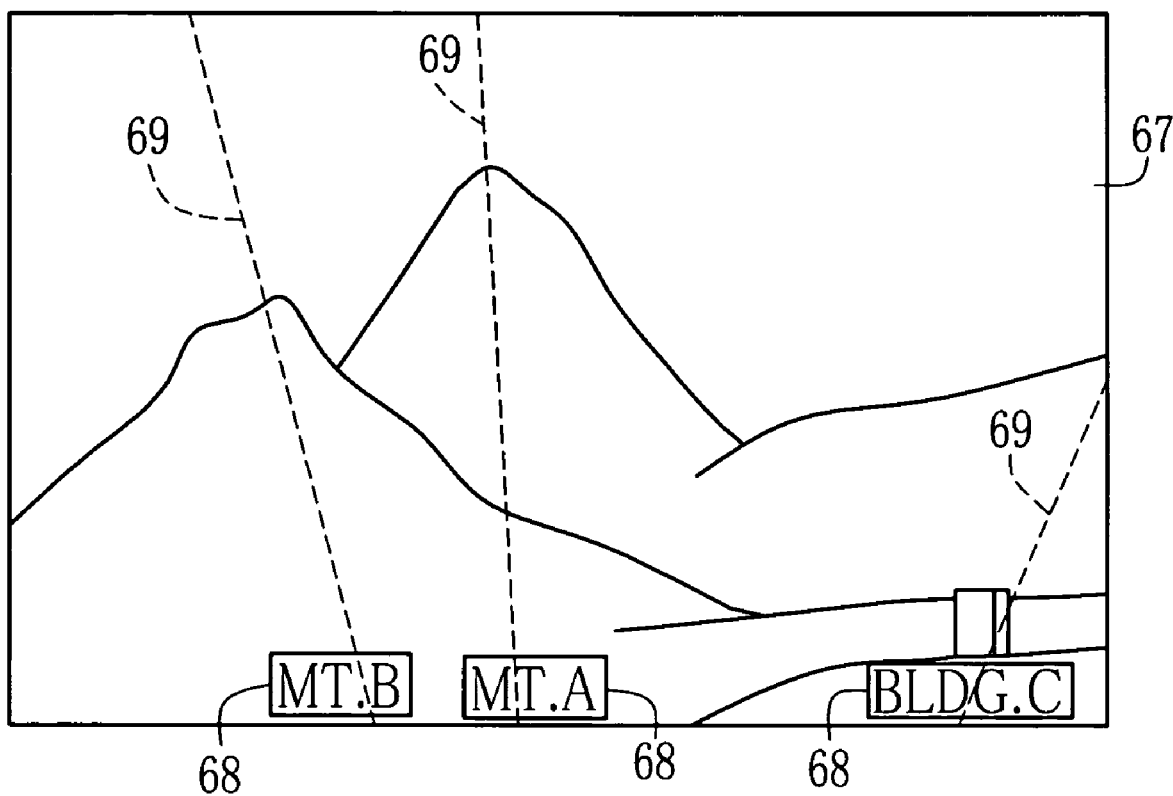
FIG. 15 is an example of displaying the through image to which the names of the subjects are fit.

A form of displaying the map image is not restricted in above examples. For instance, it is also possible to display the through image in an electrical viewfinder, and the map image in the LCD at the back of the digital camera, and vise versa. When the map image and the through image are displayed separately, the name of the map symbol 68 and the extension line 69 can be displayed in the through image 67 as shown in FIG. 15, for instance.

In the above embodiments, the digital camera is used as the example to describe the present invention; however, it is also possible to use a mobile phone with a camera. In the above examples, the digital camera, in which the image capture device and the image display device of the map display system are incorporated, is described. However, there may be a case the map image is displayed alone or with the reproduced captured image on a display of a personal computer such that the image data, to which the additional information is added, is generated by the image capture device such as the digital camera, and loaded in the personal computer. Further, it is also possible to send the additional information from the digital camera to the personal computer in the image capture mode and display the map image in the personal computer.

Although the present invention has been described with respect to the preferred embodiment, the present invention is not to be limited to the above embodiment but, on the contrary, various modifications will be possible to those skilled in the art without departing from the scope of claims appended hereto.

What is claimed is:

1. A map display system comprising:
   A. an image capture device including:
      an image sensor for capturing a subject;
      a position detector for detecting a location of said image capture device;
      an azimuth detector for detecting an orientation of said image capture device; and
      a focal distance detector for detecting a focal distance of a taking lens of said image capture device;
   B. a display device including:
      a map image generator for generating a desired map image according to additional information which is composed of said location and said orientation of said image capture device, and said focal distance of said taking lens, said map image covering an area from said location of said image capture device toward said subject; and
      a display for displaying a captured image of said subject captured by said image sensor, and said map image generated by said map image generator,
   wherein the image capture device and the display device are both located within the same enclosure.

2. A map display system as claimed in claim 1, wherein said position detector is a global positioning system (GPS) receiver which analyzes said location of said image capture device by receiving signals from GPS satellites.

3. A map display system as claimed in claim 1, wherein said map image generator loads map image data for generating said map image from a server via a mobile phone operatively connected to said image capture device.

4. A map display system as claimed in claim 1, wherein said image capture device further includes a recording medium comprising an image file having an image area and a tag area, said captured image is stored in said image area and said additional information is stored in said tag area.

5. A map display system as claimed in claim 4, wherein said display device further includes a reader for reading said image file from said recording medium.

6. A map display system as claimed in claim 1, wherein a map symbol corresponding to said subject is shown in said map image, and textual information of said subject, such as position information and a name, is added.

7. A map image display system as claimed in claim 6, wherein said map image generator fits said textual information, which is related to said map symbol on said map image, to a corresponding position on said captured image.

8. A map image display system as claimed in claim 7, wherein said display device further includes a position designator for designating an arbitrary position in said captured image, said map image generator fits said textual information in said designated position, said textual information relates to said map symbol, which corresponds to said designated position or an extension line close to said designated position, on said map image.

9. A map display system as claimed in claim 1, wherein said captured image and said map image are adjacently displayed in said display.

10. A map display system according to claim 9, wherein a range of view angle is shown on said map image.

11. A map display system as claimed in claim 10, wherein said range of view angle is indicated by a pair of field view lines.

12. A map display system as claimed in claim 11, wherein said field view lines extend from a center of one edge of said map image, representing said location of said image capture device, toward both ends of an opposite edge of said map image.

13. A map display system as claimed in claim 9, wherein said map image is displayed below said captured image, and a length of said lower edge of said captured image in a horizontal direction is equal to a length of said range of view angle at an upper edge of said map image.

14. A map display system as claimed in claim 13, wherein a display magnification of said captured image in said horizontal direction is gradually increased from a lower edge to an upper edge of said captured image.

15. A map display system as claimed in claim 14, wherein said map image and said captured image include an extension line which is extended from said location of said image capture device on said map image into said captured image through said map symbol on said map image.

16. A map display system as claimed in claim 1, wherein said map image generator generates a new map image in response to changes in said additional information.

17. A map display system as claimed in claim 16, wherein said changed additional information is said focal distance of said taking lens, and said map image generator changes a display magnification of said map image according to said focal distance.

18. The map display system according to claim 1, wherein the captured image and the map image are displayed simultaneously.

19. The map display system according to claim 1, wherein the map image represents a view from a viewpoint other than that of the image capture device.

20. The map display system according to claim 1, wherein the map image includes the location of the image capture device.

21. A digital camera comprising:
an image sensor for capturing a subject;
a position detector for detecting a location of said digital camera;
an azimuth detector for detecting an orientation of said digital camera;
a focal distance detector for detecting a focal distance of a taking lens of said digital camera;
a map image generator for generating a desired map image according to additional information which is composed of said location and said orientation of said digital camera, and said focal distance of said taking lens, said map image covering an area from said location of said digital camera toward said subject; and
a display for displaying a captured image captured by said image sensor, and said map image generated by said map image generator,
wherein the image sensor and the display are both located within the same enclosure.

22. A digital camera as claimed in claim 21, wherein said position detector is a global positioning system (GPS) receiver which analyzes said location of said image capture device by receiving signals from GPS satellites.

23. A digital camera as claimed in claim 21, wherein said map image generator loads map image data for generating said map image from a server via a mobile phone connected to said image capture device.

24. A digital camera as claimed in claim 21, wherein said image capture device further includes a recording medium, comprising an image file having an image area and a tag area, said captured image is stored in said image area and said additional information is stored in said tag area.

25. A digital camera as claimed in claim 24, wherein said display device further includes a reader for reading said image file from said recording medium.

26. A digital camera as claimed in claim 21, wherein a map symbol corresponding to said subject is shown in said map image, and textual information of said subject, such as position information and a name, is added.

27. A digital camera as claimed in claim 26, wherein said map image generator fits said textual information, which is related to said map symbol on said map image, to a corresponding position on said captured image.

28. A digital camera as claimed in claim 27, wherein said display device further includes a position designator for designating an arbitrary position in said captured image, said map image generator fits said textual information in said designated position, said textual information relates to said map symbol, which corresponds to said designated position or an extension line close to said designated position, on said map image.

29. A digital camera as claimed in claim 21, wherein said captured image and said map image are adjacently displayed in said display.

30. A digital camera according to claim 29, wherein a range of view angle is shown on said map image.

31. A digital camera as claimed in claim 30, wherein said range of view angle is indicated by a pair of field view lines.

32. A digital camera as claimed in claim 31, wherein said field view lines extend from a center of one edge of said map image, representing said location of said image capture device, toward both ends of an opposite edge of said map image.

33. A digital camera as claimed in claim 29, wherein said map image is displayed below said captured image, and a length of said lower edge of said captured image in a horizontal direction is equal to a length of said range of view angle at an upper edge of said map image.

34. A digital camera as claimed in claim 33, wherein a display magnification of said captured image in said horizontal direction is gradually increased from a lower edge to an upper edge of said captured image.

35. A digital camera as claimed in claim 34, wherein said map image and said captured image include an extension line which is extended from said location of said image capture device on said map image into said captured image through said map symbol on said map image.

36. A digital camera as claimed in claim 21, wherein said map image generator generates a new map image in response to changes in said additional information.

37. A digital camera as claimed in claim 36, said changed additional information is said focal distance of said taking lens, and said map image generator changes a display magnification of said map image according to said focal distance.

38. The digital camera according to claim 21 wherein the captured image and the map image are displayed simultaneously.

39. The digital camera according to claim 21, wherein the map image represents a view from a viewpoint other than that of the digital camera.

40. The digital camera according to claim 21 wherein the map image includes the location of the digital camera.

* * * * *